United States Patent
Zewe

(10) Patent No.: US 10,488,676 B2
(45) Date of Patent: Nov. 26, 2019

(54) UNIVERSAL METHOD OF MANUFACTURING MAGNETICALLY ATTACHABLE SUPPLEMENTAL EYEGLASSES UTILIZING MAGNETS EMBEDDED IN AN ON-DEMAND FORMED FRAME FRONT AND EYEGLASSES FORMED THEREBY

(71) Applicant: Chemistrie Properties, Inc., Pittsburgh, PA (US)

(72) Inventor: Joseph Zewe, Gibsonia, PA (US)

(73) Assignee: CHEMISTRIE PROPERTIES, INC., Pittsburgh, PA (US)

( * ) Notice: Subject to any disclaimer, the term of this patent is extended or adjusted under 35 U.S.C. 154(b) by 143 days.

(21) Appl. No.: 15/797,377

(22) Filed: Oct. 30, 2017

(65) Prior Publication Data

US 2018/0129075 A1    May 10, 2018

Related U.S. Application Data

(60) Provisional application No. 62/414,201, filed on Oct. 28, 2016.

(51) Int. Cl.
*G02C 9/04*    (2006.01)
*G02C 13/00*   (2006.01)
*G02C 7/08*    (2006.01)

(52) U.S. Cl.
CPC ............ *G02C 9/04* (2013.01); *G02C 7/086* (2013.01); *G02C 13/003* (2013.01); *G02C 2200/02* (2013.01)

(58) Field of Classification Search
CPC ...... G02C 2200/02; G02C 7/086; G02C 7/10; G02C 9/04; G02C 9/00; G02C 2200/08; G02C 7/16
USPC .......................................... 351/47, 48, 57, 58
See application file for complete search history.

(56) References Cited

U.S. PATENT DOCUMENTS

| | | |
|---|---|---|
| 2,737,847 A | 3/1956 | Tesauro |
| 4,196,981 A | 4/1980 | Waldrop |
| 5,243,366 A | 9/1993 | Blevins |
| 5,416,537 A | 5/1995 | Sadler |
| 5,568,207 A | 10/1996 | Chao |
| 5,642,177 A | 6/1997 | Nishioka |
| 5,737,054 A | 4/1998 | Chao |
| 5,786,880 A | 7/1998 | Chao |
| 5,936,700 A | 8/1999 | Masunaga |
| 6,012,811 A | 1/2000 | Chao et al. |
| 6,092,896 A | 7/2000 | Chao et al. |
| 6,109,747 A | 8/2000 | Chao |
| 6,116,730 A | 9/2000 | Kwok |
| 6,149,269 A | 11/2000 | Madison |
| 6,164,774 A | 12/2000 | Cate |
| 6,170,948 B1 | 1/2001 | Chao |
| 6,331,057 B1 * | 12/2001 | Strube ............... G02C 1/02 351/47 |

(Continued)

*Primary Examiner* — Hung X Dang
(74) *Attorney, Agent, or Firm* — Blynn L. Shideler; Krisanne Shideler; BLK Law Group

(57) ABSTRACT

Eyeglasses comprise primary glasses and auxiliary lenses having magnets for removable attaching to primary eyeglasses via magnets preferably encapsulated within the primary eyeglass frame front. Methods of forming the embedding of the magnets within the frame front provide a universal on-site on demand method of machining or 3D printing at least the frame front of the primary eyeglasses.

18 Claims, 5 Drawing Sheets

(56) References Cited

U.S. PATENT DOCUMENTS

| | | |
|---|---|---|
| RE37,545 E | 2/2002 | Chao |
| 6,354,703 B1 | 3/2002 | Sadler |
| 6,364,478 B1 | 4/2002 | Jagasia |
| 6,367,926 B1 | 4/2002 | Chao |
| 6,382,787 B1 | 5/2002 | Xie |
| 6,478,420 B2 | 11/2002 | Xiang |
| 6,612,694 B2 | 9/2003 | Jagasia |
| 6,755,522 B1 | 6/2004 | Strenk |
| 6,811,254 B2 | 11/2004 | Ifergan |
| 6,820,976 B2 | 11/2004 | Ifergan |
| 6,848,783 B2 | 2/2005 | Dietz |
| 6,866,385 B2 | 3/2005 | Madison |
| 6,883,912 B1 | 4/2005 | Madison |
| 6,893,124 B1 | 5/2005 | Kurtin |
| 7,033,018 B2 | 4/2006 | Ifergan |
| 7,040,751 B2 | 5/2006 | Madison |
| 7,048,370 B2 | 5/2006 | Starner et al. |
| 7,108,371 B1 | 9/2006 | Ifergan |
| 7,114,806 B2 | 10/2006 | Dietz |
| 7,140,728 B2 | 11/2006 | McKenna et al. |
| 7,229,169 B2 | 6/2007 | Zelman |
| 7,278,731 B2 | 10/2007 | Madison |
| 7,320,514 B2 | 1/2008 | Smith |
| 7,370,961 B2 | 5/2008 | Lerner et al. |
| 7,575,318 B2 | 8/2009 | Kux |
| 7,600,870 B2 | 10/2009 | Zelazowski |
| 7,771,044 B2 | 8/2010 | Madison |
| 10,139,650 B2 * | 11/2018 | James ................ G05B 19/4099 |

* cited by examiner

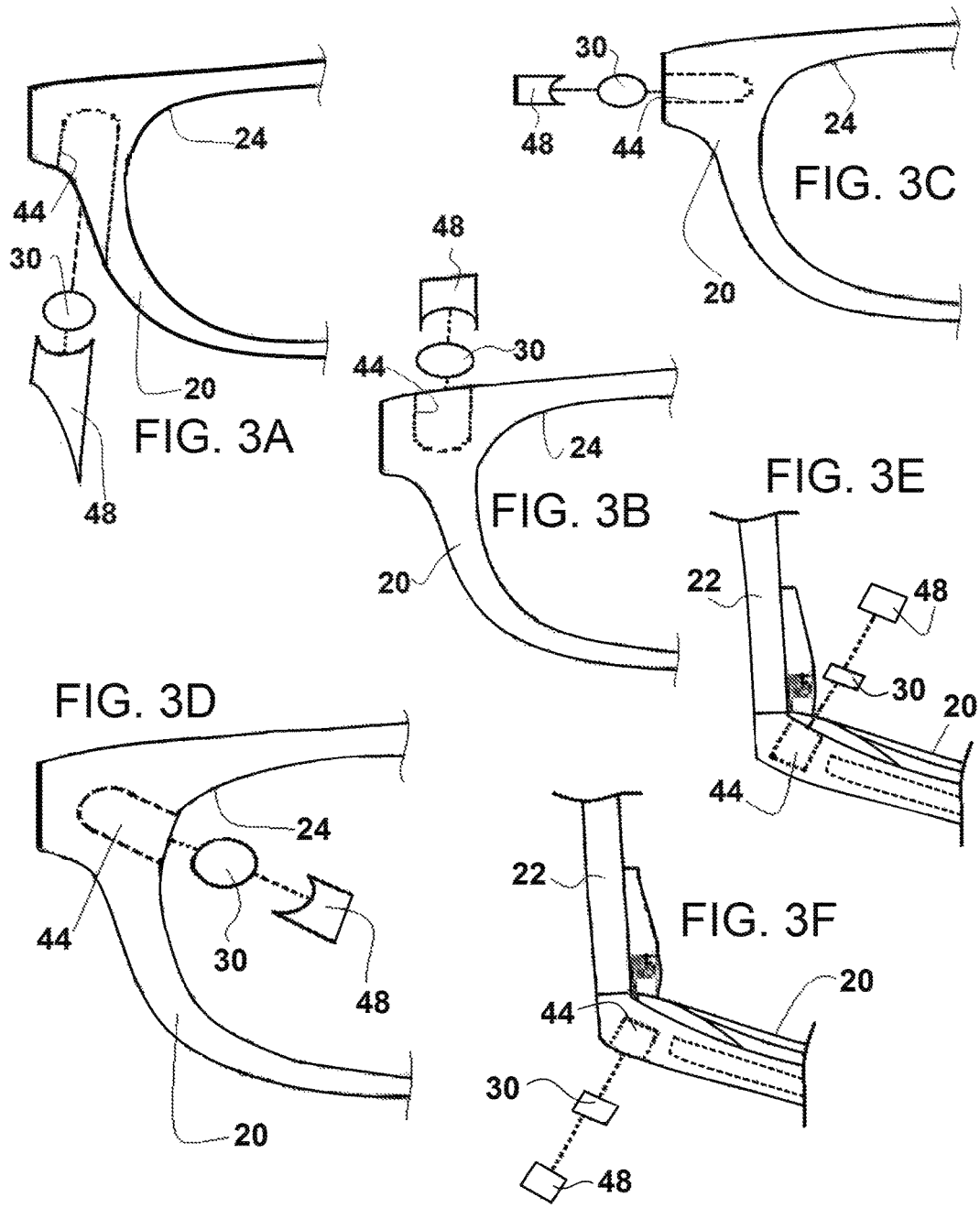

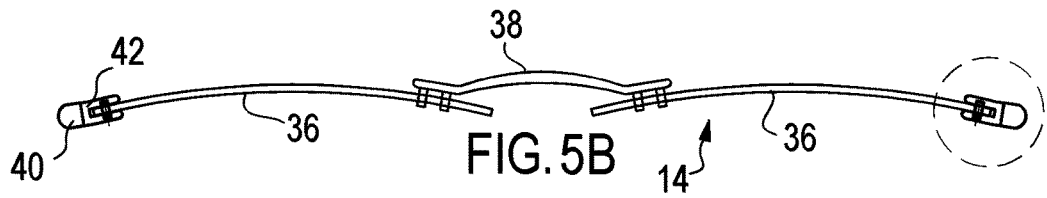
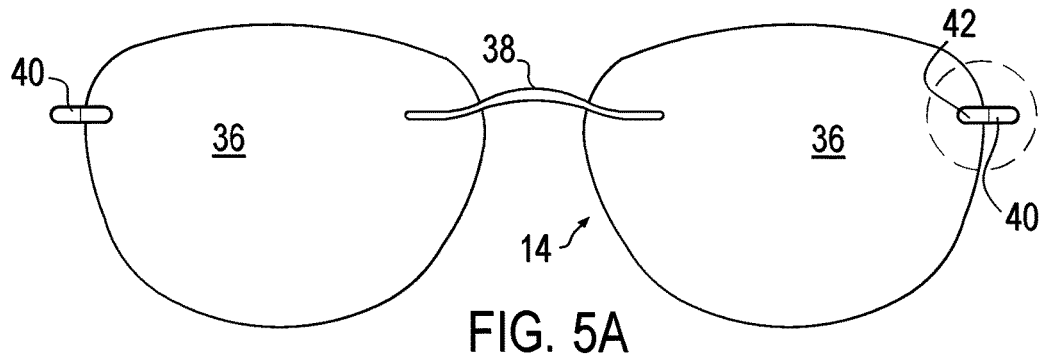
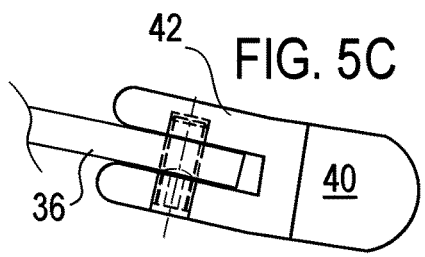
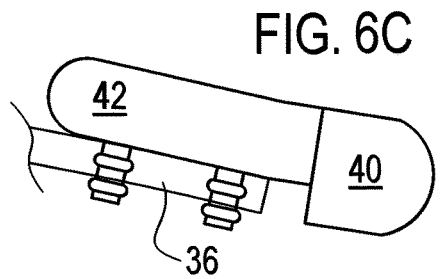
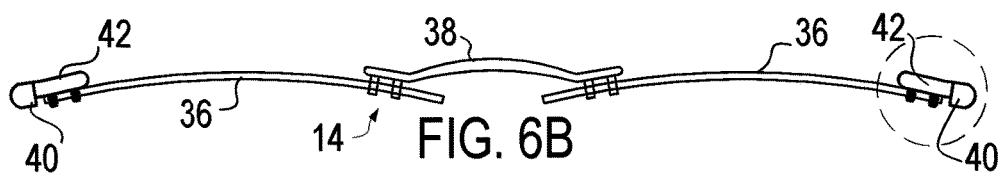
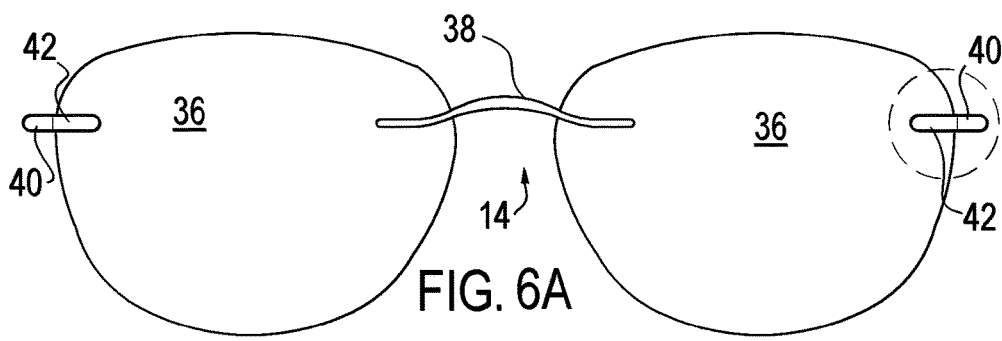

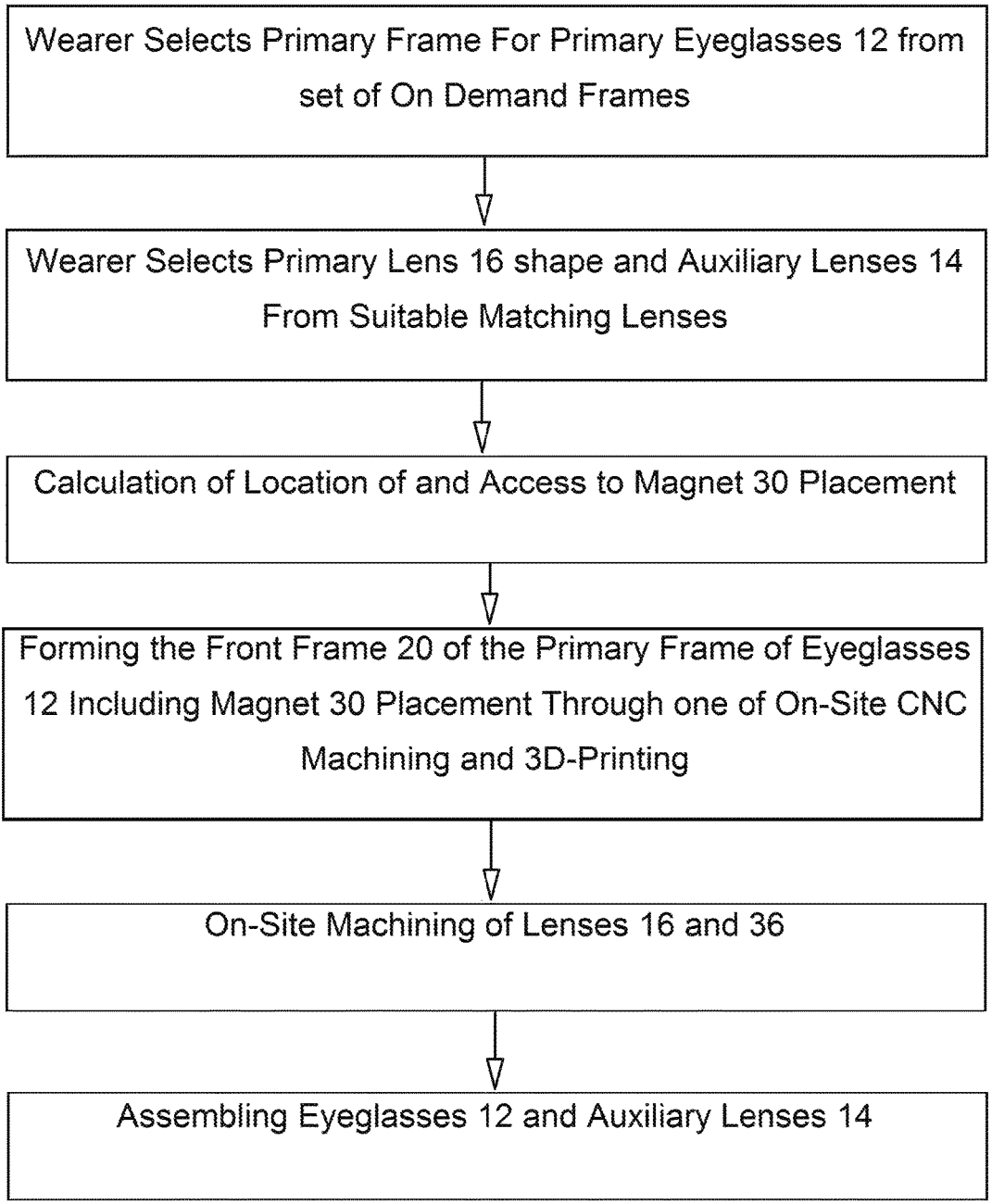

UNIVERSAL METHOD OF MANUFACTURING MAGNETICALLY ATTACHABLE SUPPLEMENTAL EYEGLASSES UTILIZING MAGNETS EMBEDDED IN AN ON-DEMAND FORMED FRAME FRONT AND EYEGLASSES FORMED THEREBY

RELATED APPLICATIONS

This application claims priority to U.S. Patent Application Ser. No. 62/414,201 filed Oct. 28, 2016, entitled "Magnetically Attachable Eyeglasses Utilizing Frame Front Encapsulated Magnets and Methods for Making Same" which application is incorporated herein by reference in its entirety.

BACKGROUND INFORMATION

1. Field of the Invention

The present invention relates to attachable eyeglasses and, in particular, to a universal method of manufacturing attachable supplemental or auxiliary lenses having a magnet for removable attaching to primary eyeglasses via magnets embedded or even encapsulated within the primary eyeglass frame front.

2. Background Information

A lasting trend in fashion eyewear has been the use of "clip-on" sunglasses. Clip-on sunglasses typically consist of auxiliary lenses with clip-like appearances that fit about the frames of the primary eyeglasses for attaching thereto. The clip-ons may be tinted or otherwise treated. Traditionally some frame manufacturers have offered clip-ons as an extra accessory, but not all eyeglass frames have corresponding clip-ons. When available the clip-on could be specially ordered for the customer or could be purchased as a set with the frames. Alternatively, aftermarket clip-ons are available, including slip-ins, flip-ups, fit-overs, fit-behinds, and many variations.

The clip-on sunglasses represent one of the most common auxiliary lenses that are coupled to primary eyeglasses, but are not the only form of auxiliary lenses. The auxiliary lenses may be designed to assist the user with a select purpose, such as enhance nighttime driving, increased magnification for select project (needlework, jewelry working or cleaning, etc.), "3D" lenses, computer glasses (blocking certain wavelengths to reduce eyestrain through prolonged computer usage), and the like. A user's primary glasses may be supplemented via auxiliary lenses for almost any purpose that lenses have been designed. Sunglasses merely represent the most commonly known auxiliary lenses type.

Magnetic-assisted clips offer a popular option for attaching clip-on lenses to eyeglasses. Magnetic clip-ons are often bundled with eyeglasses and sold as a set. Some magnetic auxiliary lenses clip-ons rely on appendages to which a small magnet is attached and attracts to a magnet attached on the eyewear frame. When clipped, the appendages overlap and magnetic attraction holds the two pieces together. Other magnetic sunglasses use magnets attached directly to magnets on or in the front face of the eyeglass frame or other parts comprising the frame.

Magnetic coupling of auxiliary lenses has a long history in the patent field as evidence by the following patent summaries, which patents are incorporated herein by reference. U.S. Pat. No. 2,737,847 discloses a magnetic bi-focal lens holder in which a magnet holds separate auxiliary lens elements.

U.S. Pat. No. 4,196,981 discloses a bridge portion of the frame in which there is a cylindrical magnet received within a sleeve of ferrous metal.

U.S. Pat. No. 5,243,366 discloses further magnification auxiliary lenses magnetically secured relative to the primary eyeglass lenses.

U.S. Pat. No. 5,416,537 discloses first magnetic members attached to the primary frame and second magnetic members attached to the auxiliary lenses.

U.S. Pat. No. 5,568,207 (now RE37,545) discloses a primary spectacle frame with two magnetic members in rear and side portions and an auxiliary spectacle frame with two magnetic member containing legs engaging with the magnetic members of the primary spectacle frame.

U.S. Pat. No. 5,642,177 discloses detachable sunglasses including a frame with a magnet to either end thereof, and a primary frame comprising a magnet on either end thereof.

U.S. Pat. No. 5,737,054 discloses a primary spectacle frame which includes a magnetic connector member secured in the middle bridge portion and an auxiliary spectacle frame with a middle bridge portion having a projection for engaging over the middle bridge portion of the primary spectacle frame and having a magnetic connector member for engaging with the primary spectacle frame connector member.

U.S. Pat. No. 5,786,880 discloses a spectacle frame having one or more magnets engaged in the spectacle frame before the magnetizable members are magnetized.

U.S. Pat. No. 5,936,700 discloses a mounting structure of detachable lenses to main spectacles wherein a first "magnetically-fitting piece" is provided on the circumference of each lens and a "second magnetically-fitting piece magnetically fitted to the corresponding first magnetically-fitting piece is provided on the other".

U.S. Pat. No. 6,109,747 discloses a primary frame having two side studs. An auxiliary frame includes two side extensions each having a rear flange with a magnet for engaging with another magnet engaged in the studs or for engaging with the magnetic material studs. The magnets are preferably disposed laterally. U.S. Pat. No. 6,170,948 is a similar disclosure.

U.S. Pat. No. 6,116,730 discloses magnetically attaching an auxiliary lenses frame to a primary eyeglass frame in which the relative motion of the auxiliary lenses frame is limited due to the attractive magnetic forces of the engaged lenses and the flanges incorporated on the primary lenses frame.

U.S. Pat. No. 6,164,774 discloses a combination eyeglass frame and attachment frame which includes two pairs of magnets, one pair being mounted on the inside surface of the temples of the eyeglass frame and the other pair being mounted at the ends of the attachment frame.

U.S. Pat. No. 6,354,703 discloses auxiliary lenses in which two pairs of magnetic clamps are adapted to grip the eyeglasses adjacent the periphery of the primary and the secondary lenses.

U.S. Pat. No. 6,364,478 discloses a primary frame which includes a magnetic member on a temple element and an auxiliary frame having a first arm extending rearwardly from the frame with a magnetic member secured thereto.

U.S. Pat. No. 6,367,926 discloses an eyeglass device which includes a bridge with a magnetic member, and two retaining mechanisms for supporting a pair of lenses. The magnetic member magnetically couples to another magnetic member at the bridge of a second auxiliary frame. Similar disclosures are found in U.S. Pat. Nos. 6,092,896, 6,012,811, 5,737,054 and 5,786,880.

U.S. Pat. No. 6,382,787 discloses a primary spectacle frame and detachable sunglasses which includes a pair of magnetic attaching arrangements connected thereto for holding the sunglasses frame on the primary spectacle frame.

U.S. Pat. No. 6,478,420 discloses rimless spectacles for use with auxiliary lenses wherein magnets are used to attract and hold the auxiliary lenses in place.

U.S. Pat. No. 6,612,694 discloses the temples of the primary frames having a magnetic member and wherein the auxiliary frame has rearward extending arms at each end, each having magnetic members.

U.S. Pat. No. 6,755,522 discloses auxiliary lenses with a set of magnets mounted on an extension adjacent to the perimeter of the frame lenses. The primary frame has a set of magnets mounted on an interior side of the elbows.

U.S. Pat. No. 6,811,254 discloses eyeglasses comprising a primary frame and an auxiliary frame detachably secured to the primary frame by interaction of magnetic members on the frames.

U.S. Pat. No. 6,820,976 discloses eyeglasses comprising a pair of spectacles having primary lenses and an auxiliary lenses assembly in which the auxiliary lenses assembly is secured by a pair of arms having magnets at one end that co-operate with magnets provided on the spectacles.

U.S. Pat. No. 6,848,783 discloses an eyeglasses assembly with at least one magnetic hinge that holds a removable, auxiliary eyeglasses attachment onto eyeglasses.

U.S. Pat. No. 6,893,124 discloses auxiliary lenses attached via magnets located on the inner periphery which is slightly larger than the spectacle rim, which rim is fabricated of, or includes, magnetic material.

U.S. Pat. No. 7,033,018 discloses an auxiliary lenses assembly which is secured by a sub-frame that includes at least one arm having a magnet at one end to co-operate with a magnet provided on a primary lenses frame.

U.S. Pat. No. 7,048,370 discloses magnetic mounted auxiliary lenses allegedly enabling user ease of removal, storage and fine tuning by adding or removing magnets in complimentary positive/negatively charged polar compositions.

U.S. Pat. No. 7,108,371 discloses primary spectacle frames and auxiliary spectacle frames which may include magnetically interacting materials disposed in the vicinity of a bridge and/or in the vicinity of one or both of side extensions.

U.S. Pat. No. 7,114,806 discloses an eyeglasses assembly comprising at least one magnetic hinge that holds a removable, auxiliary eyeglasses.

U.S. Pat. No. 7,140,728 discloses an auxiliary frame which includes a heat-treated magnetic alloy configured to magnetically couple the auxiliary frame to a primary frame having magnetizable material.

U.S. Pat. No. 7,229,169 discloses primary lenses frame with a bridge portion having a major magnetic member disposed therein, and an auxiliary frame having its own bridge portion with a minor magnetic member disposed therein.

U.S. Pat. No. 7,320,514 discloses primary and auxiliary lenses assemblies that use of "high strength micro-magnets" within the auxiliary lenses frame.

U.S. Pat. No. 7,370,961 discloses an eyewear system enables a person to switch lenses among a variety of frames via magnetic coupling in the frame and lenses or switch a variety of lenses within a single frame via such coupling.

U.S. Pat. No. 7,575,318 discloses a lenses holding "base-frame" which marries with various lenses-holding front-frames enhancement components. The base-frame and front-frame enhancement components utilize magnetized rare earth magnetic materials.

The applicant's own prior U.S. Pat. No. 7,600,870 discloses eyeglasses and supplemental lenses wherein at least one magnet is positioned in peripheral cavities drilled into primary and supplemental lenses. The applicant further attests to the commercial success of this design as set forth in the '870 patent of magnetically attachable auxiliary lens.

U.S. Pat. No. 7,771,044 discloses eyeglasses with clip-ons auxiliary lenses using housings for magnets for securing the clip-ons in a "uniblock." Similar disclosures are found in related U.S. Pat. Nos. 6,149,269, 6,883,912, 6,866,385, 7,040,751 and 7,278,731.

The magnetically coupled auxiliary lenses described in the above discussed patents, which are incorporated herein by reference, give a detailed overview of the state of the art of the general structure of magnetically coupled auxiliary lenses. While these designs can offer certain advantages in the market over other systems, they have certain problems and shortcomings.

Appendages that attach traditional clip-ons to the eyeglasses add weight to the eyeglasses that can restrict the wearer's movement. Sometimes this weight is enough to cause the clip-on to detach unintentionally. Further, appendages (or even magnets) that extend away from the surface of the auxiliary lenses can potentially scratch the primary lenses when the clip-on is being attached to the primary lenses, such as when the primary and supplemental lenses are improperly aligned during attachment.

Some of the prior art did not provide appendages and placed the magnets within the eyeglass frame, yet these presented a practical problem of methods of manufacturing the desired eye frame based coupling for the magnetically coupled auxiliary lenses. Generally, these were hand machining after-market processes, requiring great precision on the after-market manufacturer. These are typically precision operations whose intricate placement required high end tools and experience analogous to that of a jeweler. These drawbacks have greatly limited the implementations of these designs. One prior art solution was molding the magnets into the frames, but this required the investment of molds unique to each given frame design, which severely limited the frame choices upon which the supplemental lenses could be used.

Finally, another limitation of these conventional clip-ons is that they are not aesthetically pleasing to some consumers. They often lack the fine design and construction of some of the more upscale that are available on the market today. Fewer choices are available compared to the vast array of optical frames.

Accordingly, there is a need for a supplemental lenses that accommodates a variety of eyeglasses, is light weight and less likely to scratch or detach, provides stability, and/or can be customized and does not impinge upon the aesthetics of the frame.

SUMMARY OF THE INVENTION

This invention is directed to attachable supplemental or auxiliary lenses having a magnet for removable attaching to primary eyeglasses via magnets encapsulated within the primary eyeglass frame front.

Another aspect of the invention provides a universal method of on-site on-demand manufacture of eyeglasses comprising primary glasses having a primary eyeglass frame and a pair of primary lens and auxiliary lenses having magnets for removable attaching to primary eyeglasses via magnets held within the primary eyeglass frame, comprising the steps of: wearer selecting a primary frame for primary eyeglasses from a set of on demand frames; wearer selecting primary lens shape and auxiliary lenses from suitable matching lenses; Calculating location of and access to magnet placement; Forming the front frame of the primary frame of eyeglasses including magnet placement through one of On-Site CNC Machining and 3D-Printing; On-Site Machining of primary lens and lens for auxiliary lenses; and Assembling primary eyeglasses and auxiliary lenses.

These and other aspects of the present invention will be clarified in the description of the preferred embodiment of the present invention described below in connection with the attached figures in which like reference numerals represent like elements throughout.

BRIEF DESCRIPTION OF THE DRAWINGS

FIGS. 3A-F are enlarged partially exploded views of encapsulated magnets formed by drilling according to distinct aspects of the present invention;

FIG. 5A is a front elevation view of attachable supplemental or auxiliary lenses according to one embodiment of the present invention;

FIG. 5B is a top plan view of attachable supplemental or auxiliary lenses of FIG. 5A;

FIG. 5C is an enlarged view of the magnet of the attachable supplemental or auxiliary lenses of FIG. 5A;

FIG. 6A is a front elevation view of attachable supplemental or auxiliary lenses according to one embodiment of the present invention;

FIG. 6B is a top plan view of attachable supplemental or auxiliary lenses of FIG. 6A;

FIG. 6C is an enlarged view of the magnet of the attachable supplemental or auxiliary lenses of FIG. 6A; and FIG. 7 schematically illustrates a universal method of manufacturing magnetically attachable supplemental eyeglasses utilizing magnets embedded in an on-demand formed frame front in accordance with one aspect of the present invention.

BRIEF DESCRIPTION OF THE PREFERRED EMBODIMENTS

Figure 1:
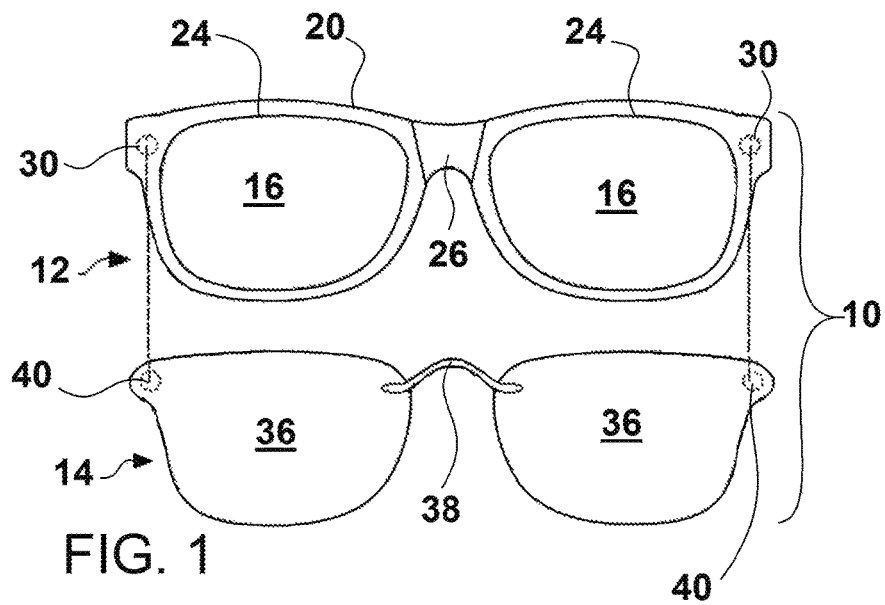
FIG. 1 is a front elevation view of eyeglasses with primary eyeglasses and attachable supplemental or auxiliary lenses according to one embodiment of the present invention.

This invention relates to eyeglasses 10 with primary eyeglasses 12 and attachable supplemental or auxiliary lenses 14 having magnets for removable attaching to primary eyeglasses via magnets encapsulated within a primary eyeglass frame front. Additionally the present invention relates to a universal method of manufacturing magnetically attachable supplemental eyeglasses 14 utilizing magnets 30 embedded in an on-demand formed frame front 20. "Universal" within the meaning of this application defines that the method is applicable across a wide variety of on-demand formed frame fronts 20. "On-demand" within the meaning of this application defines that the method of forming the frame front 20 is based upon inputs/selections of the final user or consumer, typically the final dimensions or shape of the frame front 20 is based upon the consumer selections. In other words the "on-demand" frame fronts 20 are custom as opposed to stock frame fronts 20.

The primary eyeglasses 12 are comprised of primary eyeglass frame and primary lenses 16.

Lenses 16 are generally either single-vision or multi-focal. Single vision lenses correct just one type of vision problem; multi-focal lenses help with distance and near vision problems. Lenses 16 are typically formed from glass or plastic with plastic being more common.

Suitable glass optical lens substrates include soda-lime-silica glass, such as soda-lime-silica slide glass sold from Fisher, or aluminosilicate glass such as GORILLA® glass from Corning Incorporated, or DRAGONTRAIL® glass from Asahi Glass Co., Ltd.

Suitable examples of plastic optical lens substrates are more varied and include polymers prepared from polyol (allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers prepared from polyol(meth)acryloyl terminated carbonate monomer, diethylene glycol dimethacrylate monomers, ethoxylated phenol methacrylate monomers, diisopropenyl benzene monomers, ethoxylated trimethylol propane triacrylate monomers, ethylene glycol bismethacrylate monomers, poly(ethylene glycol) bismethacrylate monomers, or urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN®; polyesters, such as the material sold under the trademark MYLAR®; poly (ethylene terephthalate); polyvinyl butyral; poly(methyl methacrylate), such as the material sold under the trademark PLEXIGLAS®, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

The lenses 16 may further be coated with one or more coatings for a multitude of purposes. Anti-glare coatings, photochromic coatings, scratch resistant coatings, mar resistant coatings, and combinations thereof are representative examples of lens coatings.

The primary eyeglass frame is made up from three parts: the frame front 20 or chassis, a left temple 22 (or earpiece), and a right temple 22 (or earpiece), with the temples 22 generally hinged to the front frame 20.

The frame front 20 includes two lens holding elements 24 coupled by a bridge 26. The bridge 26 of the frame front 20 serves two functions. First, it supports the eyeglasses 10 on the nose. Second, it connects the two lens holding elements 24. There are several ways to rest the front of the eyeglasses 10 on the wearer's nose. Adjustable rocking nose pads may be attached to the bridge 26. A special bridge insert of molded plastic, sometimes known as a form-fit bridge, may also be used. Finally, the bridge 26 and nose rest area may be integral to the frame front 20. The latter technique is used for most plastic frames. The bridge 26 in plastic frames may be further classified into the keyhole bridge and the saddle style bridge.

The two lens holding elements 24 form openings (or apertures) for the two optical lenses 16—a right lens 16 and a left lens 16. The left lens 16 is the opening 24 on the wearer's left. The opening 24 for the right lens 16 is the opening 24 on the wearer's right.

Frames are made of many different types of materials. Different materials are used for style, durability, color, and ease of use but, for the most part, frames are made from plastic, metal, bone or horn (commonly water buffalo horn), and wood. Plastic frames are available in many colors and are usually thicker and wider than metal frames. Metal frames tend to be thinner, lightweight, and strong. Each material has features that make it popular.

Some of the different types of conventional plastic frames include zylonite (or Zyl) or cellulose acetate, propionate, nylon, Polyetherimide (PEI) such as Ultem 1000, and a memory polymer TR90, each material being very cost-effective and creative option for eyewear and extremely lightweight.

One of the key features of the present invention is the provision of a pair of magnets 30 (shown in phantom in FIGS. 1 and 2A-B) embedded, or preferably encapsulated as shown, within the frame front 20 generally adjacent the apertures 24 and temples 22 as shown. The magnets 30 within the present invention are preferably micro-magnets, specifically rare earth magnets.

Rare earth magnets are strong permanent magnets made from alloys of rare earth elements. Developed in the 1970s and '80s, rare-earth magnets are the strongest type of permanent magnets made, producing significantly stronger magnetic fields than other types. As rare earth magnets are extremely brittle and also vulnerable to corrosion, the commercially available magnets are usually coated or plated to protect them from breaking, chipping, or crumbling into powder. The encapsulated design of magnets 30 of the present invention further protects the magnets 30 in the present system.

Although there are other types of rare earth magnets that may be suitable, neodymium magnets are preferable for the magnets 30 of present invention. Invented in the 1980s, neodymium magnets are the strongest and most affordable type of rare-earth magnet. They are made of an alloy of neodymium, iron and boron ($Nd_2Fe_{14}B$), sometimes abbreviated as NIB. Neodymium magnets are used in numerous applications requiring strong, compact permanent magnets as they currently yield the highest magnetic field strength and have a higher coercivity (which makes them magnetically stable) than commercially available alternatives, but they have a lower Curie temperature and are more vulnerable to oxidation than samarium-cobalt magnets. Corrosion can cause unprotected magnets to spall off a surface layer, or to crumble into a powder. Use of protective surface treatments such as gold, nickel, zinc and tin plating and epoxy resin coating can provide corrosion protection. The placement of the magnet 30 within the frame front 20 in the present invention further protects these magnets 30.

The attachable supplemental or auxiliary lenses 14 include a left lens 36 and a right lens 36 coupled by a bridge 38. The design of the attachable supplemental or auxiliary lenses 14 allows these lens 36 and the entire auxiliary lenses 14 to be easily formed in the optometrist office through in-house equipment. The lenses 36 may be formed of similar substrates of lenses 16 and may be coated in the same manner. As stated above the lenses 36 may be formed as sunglasses, which represent one of the most common auxiliary lenses 14 that are coupled to primary eyeglasses 12, but are not the only form of auxiliary lenses 14. The auxiliary lenses 14 may be designed to assist the user with a select purpose, such as enhance nighttime driving, increased magnification for select project (needlework, jewelry working or cleaning, etc.), "3D" lenses, computer glasses (blocking certain wavelengths to reduce eyestrain through prolonged computer usage), and the like. The user's primary glasses 12 may be supplemented via auxiliary lenses 14 for almost any purpose that lenses have been designed. Sunglasses merely represent the most commonly known auxiliary lenses 36 type.

Figure 2A:
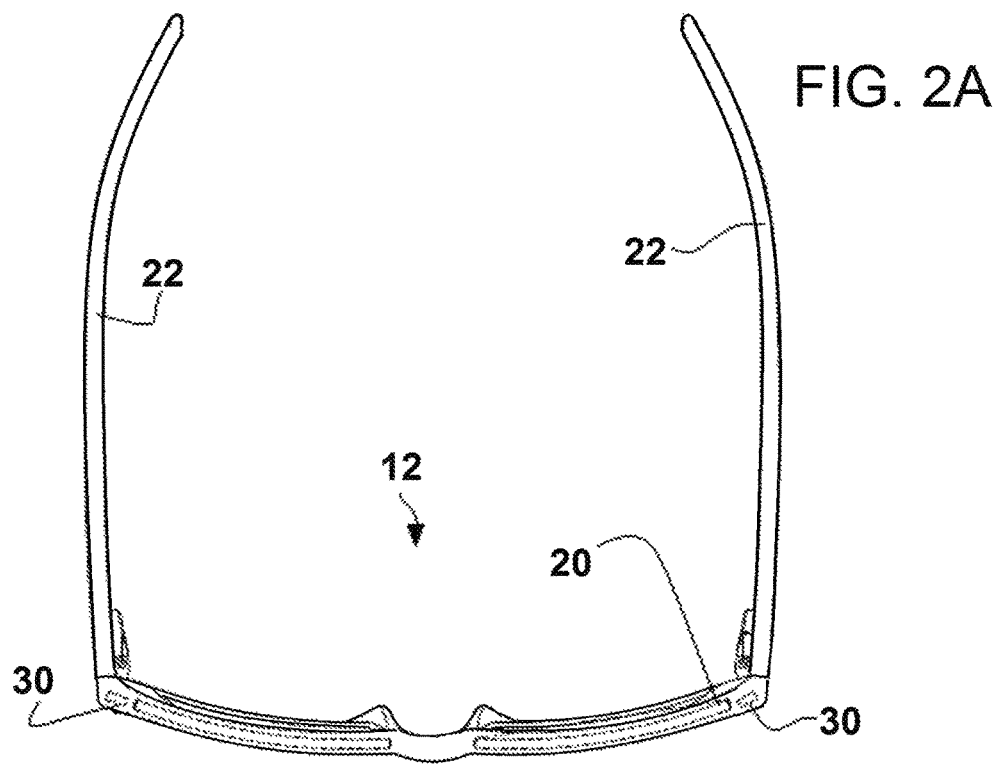
FIGS. 2A-C are views of primary eyeglasses according to one embodiment of the present invention.
Figure 2B:
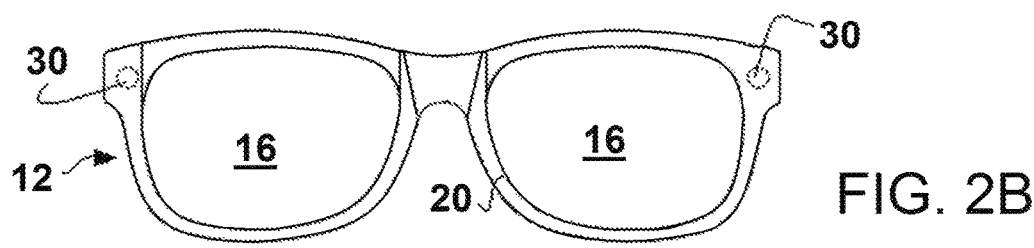

The auxiliary lenses 14 include magnets 40 that are generally aligned with the embedded magnets 30 of the primary eyeglasses 12 for securing the auxiliary lenses 14 to the primary eyeglasses 12 through attraction of the magnets 40 and 30. The magnets 40 may be coupled to the lens 36 as shown in FIG. 1 and as generally disclosed in the applicant's own prior U.S. Pat. No. 7,600,870 in which the magnets 40 of the auxiliary lenses 14 are positioned in peripheral cavities drilled into the supplemental lenses 36. Alternatively, the magnets 40 may be coupled in an extension member 42 extending from the lens 36, as shown in FIGS. 5A-C and 6A-C, wherein the magnets 40 on the extension member 42 are aligned with the magnets 30 of the primary eyeglasses 12. The extension member 42, if used, will generally match the design of the bridge 38. The varied positioning of the magnets 40 within the lens 36 or on an extension member 42 allows flexibility in the shape of the lens 36 as desired by the wearer.

With the magnets 30 encapsulated and hidden from view it improves the aesthetic appeal of the frame of the primary glasses 12. Further the encapsulation of the magnets 30 improves the life of the magnets 30. Further in the preferred methods of forming the encapsulated magnets 30 discussed below (except for the process of FIG. 3F), the front of the frame front 20 directly in front of the magnet 30 is not disturbed allowing this frame front 20 structure to better resist the force of the coupled magnets 30 and 40, particularly over time, and not crack or prematurely exhibit other undesirable deterioration.

Preferably the magnets 30 are general circular face, disc shaped magnets. The disc shaped magnets 30 are preferably 1.6-5.0 millimeters in diameter, more preferably 2.5-3.2 millimeters in diameter for single magnet implementation. The thickness of the single magnets 30 may be about 0.5 millimeters to 5 millimeters, generally 1 to 3 millimeters. Smaller magnets 30 of 0.8-1.6 millimeters in diameter may be used in which a cluster of magnets 30 are used as shown generally in FIG. 4B. Grooves on the side of the magnets 30 may assist in mounting of the magnet 30 within the frame front 20. The preferred orientation of the magnets 30 is generally parallel to the front of the frame front 20. As the frame front 20 is curved (base curve) it is more precise to say the front face of the magnet 30 is parallel to a tangent to the frame front 20 at a location immediately in front of the magnet 30.

The frame fronts 20 have a base curve, which is a radius to the sphere of the front of the frame, which can be considered a number defining the horizontal and vertical curvature of the frame front 20. Lenses 16 have a base curve that may differ from the base curve of the frame front 20, in other words the base curve of the frame front 20 can accept a range of lens 16 base curves. It is an important aspect of the present invention that the lenses 36 of the auxiliary lenses 14 have a base curve matching the base curve of the frame front 20. The present invention provides lens 36 being based curved matched to base curve of frame front 20 as opposed to matching the curve of some auxiliary frame front to the base curve of the frame front 20, and also opposed to matching the base curve of lens 36 to the base curve of the lens 16. The lens 36 being based curved matched to base curve of frame front 20 is important to reduce glare, and have desired fit, and yield a lighter matching auxiliary lens 14.

Universal Method of On-Demand Manufacture

As noted above the present invention provides a universal method of manufacturing magnetically attachable supplemental eyeglasses 14 utilizing magnets 30 embedded in an on-demand formed frame front 20. "Universal" within the meaning of this application defines that the method is applicable across a wide variety of on-demand formed frame fronts 20. "On-demand" within the meaning of this application defines that the method of forming the frame front 20 is based upon inputs/selections of the final user or consumer, typically the final dimensions or shape of the frame front 20 is based upon the consumer selections. In other words the "on-demand" frame fronts 20 are custom as opposed to stock frame fronts 20.

The universal method of on-site, on-demand manufacture has the wearer initially selecting a desired primary frame for the wearer's desired primary eyeglasses 12 from set of on demand frames. The set of on demand frames being those frames that the particular site can manufacture through available CNC machining or 3D printing. For suitable CNC machining equipment see FreTor Srl, CMS North America, Inc (e.g. Monofast™ brand); CNC-Step e.K.; Kent USA; DMG Mori; and Chiron. For CNC machined frames the on demand frames are those that the available onsite CNC machine as the appropriate stock material ("blanks" for forming a specific frame front 20) and the dimensions suitable to generate a manufacturing profile or program on the available machine. The wearer selected frames will include a frame front 20, bridge 26 and temples 22. The bridge 26 and temples 22 may have wearer variability (e.g. color and styles) that is selected by the wearer in a normal fashion and may further have conventional processing (e.g. heating and bending temples, or adding decorative or other elements).

The universal method of on-site on-demand manufacture has the wearer selects primary lens 16 shape and auxiliary lenses 14 from suitable matching lenses, namely those suitable for use with the selected frame. As noted above a given frame front 20 can receive a variety of primary lens 16 and the wearer or user may have some variability in the shape of such lens 16 within the acceptable range of the selected frame front 20. Similarly the user may have some variability in the final desired shape of the auxiliary lenses 14. As noted above the invention can have the magnet 40 within the lens 36 or in an extension member 42 such that the magnet 40 location does not specifically limit the shape of the lens 36 and the auxiliary lenses 14. The contour or base curve of the auxiliary lenses 14 is preferably matching the base curve of the frame front 20 as noted above.

The universal method of on-site on-demand manufacture will next have a calculation or determination of the precise location of, and access to magnet 30 placement within the frame front 20. It is preferred that the magnets 30 are encapsulated entirely within the frame front 20 as discussed above, but they need not be and may be formed as visible from the front of the frame front 20. The first issue is the positioning of the magnets 30 in the selected frame front 20. For each frame front 20 there is a default proposed position for the magnets 30 within the selected frame front 20, and it is expected that most users will elect to keep the magnets 30 within the default proposed position, however the user may elect to move these proposed locations slightly as the shape of the auxiliary lenses 14 is determined, and possibly with variations in the user selected lens 16 shape. Minor changes in the proposed position of the encapsulated magnets 30 can result in noticeable changes to the look of the resulting auxiliary lenses 14. The user will be able to move the proposed position of the magnets 30 within an acceptable envelope of acceptable positions within the given frame front 20, wherein the acceptable positions will effectively leave enough frame front material adjacent the desired magnet position that none of the other structural aspects of the frame front 20 are compromised with the desired magnet 30 position.

The mechanism of the user selection of the frame will typically be a user (and optionally a technician) working with a 3D model of the final eyeglass 12 and auxiliary frame 14 with the user (and/or technician) changing color shape of various components until a final design is selected. As the user changes the shape of the Auxiliary lenses 14 (and/or the shape of the lens 16) the 3D model will automatically adjust the position of the magnets 30 within an accepted envelope. The proposed auxiliary lenses 14 will automatically switch between the default magnet 40 positions within the lens 36 to the use of an attachment 42 when the attachment is required, although a user can select the use of an attachment 42 as a style preference.

Once the precise location of magnet 30 placement within the frame front 20 is determined then the universal method of on-site on-demand manufacture will next determine the best or desired access to magnet 30 placement within the frame front 20.

The universal method of on-site on-demand manufacture will form the front frame 20 of the primary frame of eyeglasses 12, including magnet 30 placement through one of on-site CNC machining and 3D-printing.

CNC Machining Frame Front 20

Figure 2C:
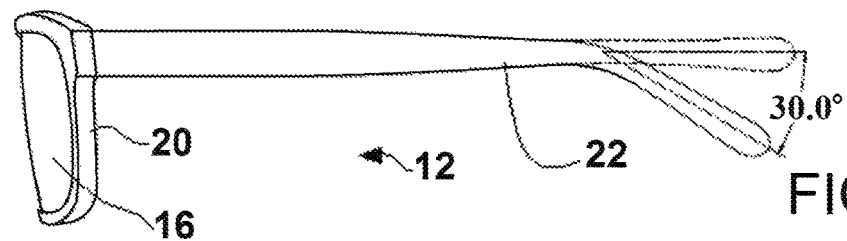

The machining of the frame front 20 includes the exterior and the openings or apertures 24, and this is generally well known in the art. As shown in the FIGS. 3A-F there are several preferred methods of accessing or forming the embedding of the magnets 30 within the frame front 20 with CNC machining. The preferential access includes drilling from the bottom of the frame front 20 (FIG. 3A), drilling from the top of the frame front 20 (FIG. 3B), drilling from the temple side of the frame front 20 (FIG. 3C), drilling from the lens holding element or aperture 24 of the frame front 20 (FIG. 3D), drilling from the back of the frame front 20 (FIG. 3E). Access to the magnet 30 position may further include drilling from the front of the frame front 20 (FIG. 3F), however this is not preferred because it places the plug 48 in the front of the frame, however if the final design elects to show a visible magnet 30 (e.g. as an ornamental accent), then front drilling is acceptable. In all of these methods the magnets 30, when embedded, are not visible from the front of the frame front 20 as shown in FIG. 2C. The method of encapsulating the magnets 30 via CNC machining includes drilling a slot 44 into the front frame 20 from the bottom (FIG. 3A), or the top (FIG. 3B), or the temple side (FIG. 3C), or the aperture 24 (FIG. 3D) or the back (FIG. 3E) or the front (FIG. 3F). Precise CNC machining or milling equipment allows for the slots 44 to be easily formed. After forming the slot 44 the magnet 30 is slid into position and held in place with an adhesive and/or resin plug 48. The adhesive and/or resin plug 48 fills the remainder of the slot 44, holds the magnet 30 and blends into the front frame 20 to be effectively unobtrusive and invisible. The plug 48 in the access shown in FIGS. 3A-E is in a position not effected by the repeated coupling of the auxiliary lenses 14 namely not from the front of the front frame 20. The adhesive may go completely around the magnet 30 particularly with grooves in the side of the magnet 30, but the plug 48 represents a more prominent collection of material and is shown as a separate element.

3D Printing Frame Front 20

3D printing, also known as additive manufacturing (AM), refers to various processes used to synthesize a three-dimensional object. In 3D printing, successive layers of material are formed under computer control. 3D printing in the term's original sense refers to processes that sequentially deposit material onto a powder bed with inkjet printer heads. More recently, the meaning of the term has expanded to encompass a wider variety of techniques such as extrusion and sintering-based processes. Eyeglass frames are relatively easy for 3D printing technologies and allow the frames to be customized for the individual with ease by rapidly changing frame styles and associated components and the like. In the present invention 3D printing allows for easy encapsulation of the magnets 30 within the frame front 20. Specifically the frame front 20 is printed until the aperture receiving the magnets 30 are partially formed, and the process is paused while the magnets 30 are placed in position and the 3D printing process is resumed to fully encapsulate the magnets 30. This process is applicable for frames formed of any material that may be 3D printed. Suitable 3D printers are available from Markforged and FormLabs, with other suitable 3D printing manufacturers becoming available constantly.

The universal method of on-site on-demand manufacture will form (shape) the lenses 16 and 36 onsite in known fashion. The Auxiliary lenses 14 will need to include the magnets 40 as noted above. Then the universal method of on-site on-demand manufacture will assemble the eyeglasses 12 and auxiliary lenses 14

Figure 4A:
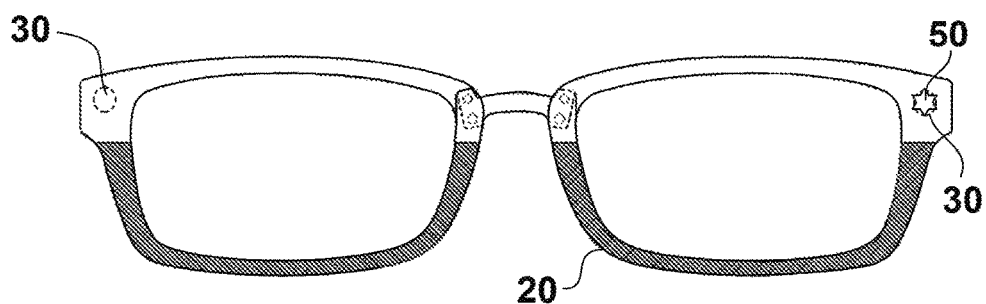
FIGS. 4A-B are front elevation views of distinct frame fronts according to the present invention.
Figure 4B:
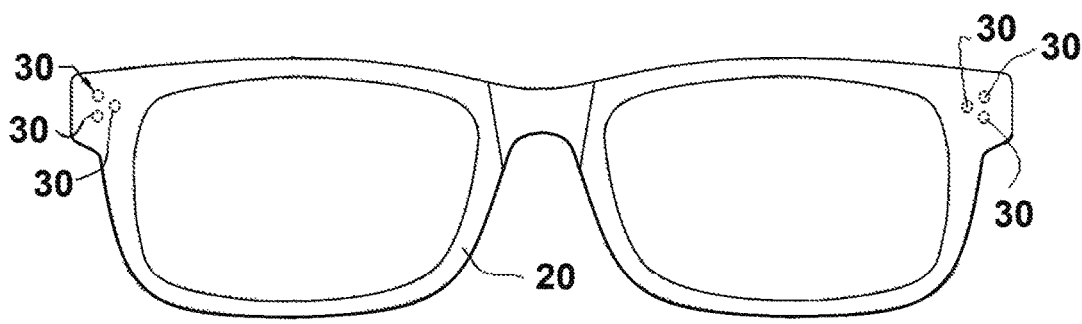

FIGS. 4A-B are front elevation views of distinct frame fronts according to the present invention. It is worth noting that in the embodiment of FIG. 4B the single magnet 30 on each side is replaced with an array of multiple encapsulated smaller magnets 30 as shown. Further the encapsulated magnets 30 allow the frame to be easily accessorized with decorative baubles 50 coupled with magnets, such as SWARASKI® crystals.

Insert Molding Frame Front 20

Many eyeglass frames may be molded and insert molding allows for precise encapsulation of the magnets 30 within the frame front 20. The insert molding process itself is the same process used during injection molding. Solid pellets of raw material are melted and extruded into a frame front mold—the plastic is then solidified—and then the press opens and the molded frame fronts 20 parts are ejected. Insert molding uses the same materials as the injection molding process. The magnets 30 represent the inserts which are is placed in the mold before the material is injected into the mold, and typically held by small pins (preferably not extending from the front of the frame front 20). Further it is possible that as the material flows into the mold and surrounds the magnets 30, the holding pins can be withdrawn slightly after the magnet 30 is firmly secured but prior to the setting of the plastic so that the holding pin spaces are filled in in the final piece. Insert molding is neither, a universal process nor an on-demand process. A mold must be designed for every frame style, together with insert molding protocols. Thus insert molding is expensive across a wide variety of frames, however it remains an option for the manufacturer of such molded frames, however there is no variation in magnet 30 positioning It is apparent that many variations to the present invention may be made without departing from the spirit and scope of the invention. The present invention is defined by the appended claims and equivalents thereto.

What is claimed is:

1. Eyeglasses comprising primary glasses having a primary eyeglass frame and a pair of primary lens and auxiliary lenses having magnets for removable attaching to primary eyeglasses via magnets encapsulated within the primary eyeglass frame, wherein the primary eyeglass frame includes a frame front housing the encapsulated magnets and left and right temples hinged to the frame front, wherein the frame front includes two lens holding elements coupled by a bridge, wherein each lens holding element forms an aperture for one primary lens, and wherein the encapsulated magnets are adjacent one of the lens apertures formed by the lens holding elements whereby the embedded magnets are below a horizontal line extending across a top of the lens apertures and outside of a vertical line at an outermost edge of an adjacent lens aperture.

2. The eyeglasses according to claim 1 wherein the frame front is formed of one of plastic, metal, bone or horn, and wood.

3. The eyeglasses according to claim 1 wherein the encapsulated magnets are rare earth magnets.

4. The eyeglasses according to claim 3 wherein the encapsulated magnets are neodymium magnets.

5. The eyeglasses according to claim 1 wherein the auxiliary lenses include magnets that are generally aligned with the embedded magnets of the primary eyeglasses for securing the auxiliary lenses to the primary eyeglasses.

6. The eyeglasses according to claim 5 wherein the magnets of the auxiliary lenses are positioned in peripheral cavities drilled into supplemental lens of the auxiliary lenses.

7. The eyeglasses according to claim 5 wherein the magnets of the auxiliary lenses are in an extension member extending from supplemental lens of the auxiliary lenses.

8. The eyeglasses according to claim 1 wherein the frame front has a base curve which is a radius to the sphere of the front of the frame, and the lens of the auxiliary lenses have a base curve matching the base curve of the frame front.

9. A universal method of on-site on-demand manufacture of eyeglasses comprising primary glasses having a primary eyeglass frame and a pair of primary lens and auxiliary lenses having magnets for removable attaching to primary eyeglasses via magnets held within the primary eyeglass frame, comprising the steps of:

wearer selecting a primary frame for primary eyeglasses from a set of on demand frames, wherein the primary eyeglass frame includes a frame front and left and right temples hinged to the frame front, wherein the frame front includes two lens holding elements coupled by a bridge, wherein each lens holding element forms an aperture for one primary lens;

wearer selecting primary lens shape and auxiliary lenses from suitable matching lenses;

Calculating location of and access to magnet placement, wherein the magnet placement is in the frame front adjacent one of the lens apertures formed by the lens holding elements whereby the magnet position is below a horizontal line extending across a top of the lens apertures and outside of a vertical line at an outermost edge of an adjacent lens aperture;

Forming the front frame of the primary frame of eyeglasses including magnet placement through one of On-Site CNC Machining and 3D-Printing;

On-Site Machining of primary lens and lens for auxiliary lenses; and

Assembling primary eyeglasses and auxiliary lenses.

10. The universal method of on-site on-demand manufacture of eyeglasses according to claim 9 wherein the magnets are encapsulated within the primary eyeglass frame.

11. The universal method of on-site on-demand manufacture of eyeglasses according to claim 10 further including the step of encapsulating the magnets 30 via CNC machining includes drilling a slot into the front frame, sliding the magnet into position and forming a resin plug over the remaining slot.

12. The universal method of on-site on-demand manufacture of eyeglasses according to claim 11 wherein the drilling of the slot is from one of the bottom, the top, the temple side, the aperture or the back of the frame front.

13. The universal method of on-site on-demand manufacture of eyeglasses according to claim 10 further including the step of encapsulating the magnets via 3D printing at least the front frame.

14. The universal method of on-site on-demand manufacture of eyeglasses according to claim 10 wherein the frame front of the frame has a base curve which is a radius to the sphere of the front of the frame, and the lens of the auxiliary lenses have a base curve matching the base curve of the frame front.

15. The universal method of on-site on-demand manufacture of eyeglasses according to claim 10 wherein the auxiliary lenses include magnets that are generally aligned with the embedded magnets of the primary eyeglasses for securing the auxiliary lenses to the primary eyeglasses.

16. The universal method of on-site on-demand manufacture of eyeglasses according to claim 10 wherein the frame front is formed of one of plastic, metal, bone or horn, and wood, and wherein the magnets are rare earth magnets.

17. The universal method of on-site on-demand manufacture of eyeglasses according to claim 16 wherein the magnets are neodymium magnets.

18. The product made according to the method of claim 10.

* * * * *